United States Patent

[11] 3,600,009

| [72] | Inventor | Samuel Shupper<br>North Hollywood, Calif. |
|---|---|---|
| [21] | Appl. No. | 853,700 |
| [22] | Filed | Aug. 28, 1969 |
| [45] | Patented | Aug. 17, 1971 |
| [73] | Assignee | Jerome Feig, Trustee doing business as Great American Manufacturing and Sales Co., Pacoima, Calif. |

[54] FLEXIBLE CONNECTOR HAVING UNION NUTS
3 Claims, 3 Drawing Figs.

[52] U.S. Cl. ................................. 285/52, 285/226
[51] Int. Cl. ................................ F16l 19/02, F16l 59/00
[50] Field of Search ........................ 285/52, 354, 226, 174, 379

[56] References Cited
UNITED STATES PATENTS

| 149,005 | 3/1874 | Trapp | 285/354 |
| 299,206 | 5/1884 | Deavs | 285/52 |
| 554,332 | 2/1896 | Carson | 285/52 |
| 3,115,354 | 12/1963 | Bowan et al. | 285/52 |
| 3,193,310 | 7/1965 | Hildner | 285/354 X |
| 3,201,148 | 8/1965 | Shurtleff | 285/354 X |
| 3,408,093 | 10/1968 | Epstein | 285/52 |
| 3,501,171 | 3/1970 | Baron | 285/52 |

FOREIGN PATENTS

| 1,084,003 | 6/1954 | France | 285/174 |

Primary Examiner—Thomas F. Callaghan
Attorney—Flam & Flam

ABSTRACT: Seal washers frictionally received within the threads of union nuts are kept in place and prevented from being dislodged by the stop rings that limit axial movement of the union nuts.

PATENTED AUG 17 1971 3,600,009
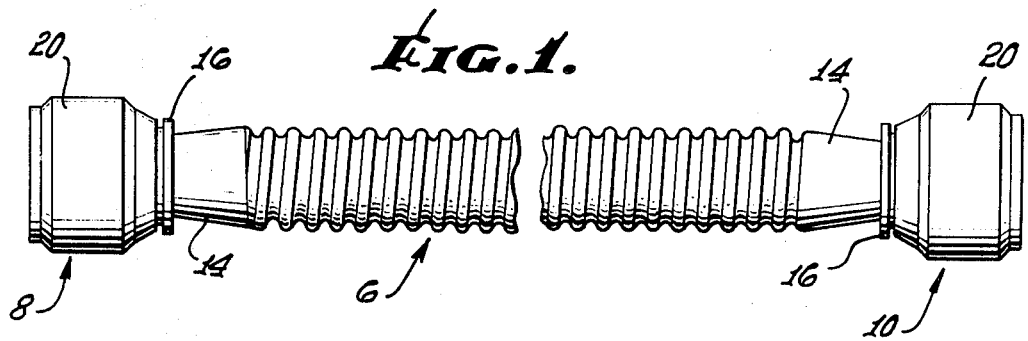
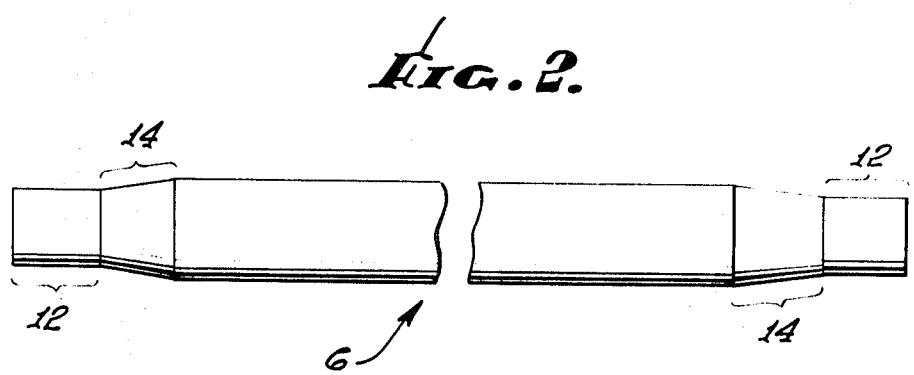
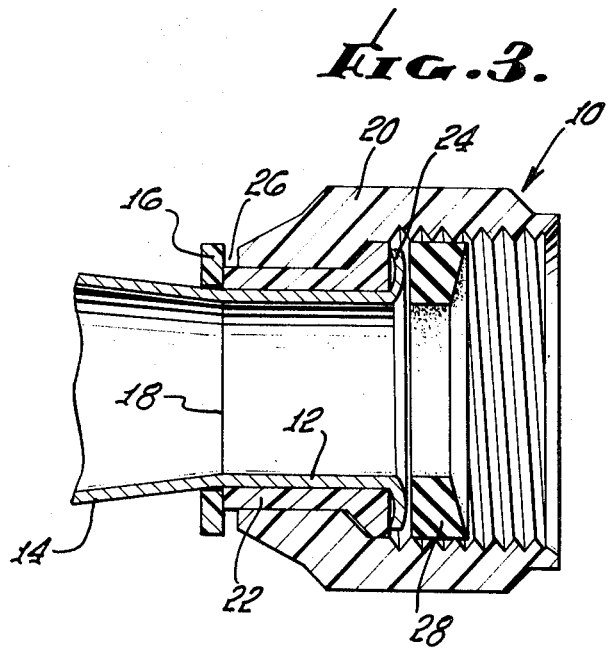
INVENTOR.
SAMUEL SHUPPER
By Flam and Flam
ATTORNEYS.

FLEXIBLE CONNECTOR HAVING UNION NUTS

BACKGROUND OF THE INVENTION

1. Field of the Invention

This invention relates to pipe joints or couplings and, more particularly, to adapterless unions mounted upon opposite ends of a flexible thin-walled conduit whereby connections are readily made to two rigid pipes. Devices of this sort are especially useful in connecting water heaters to the influent cold water pipe and to the effluent hot water pipe.

2. Discussion of the Prior Art

Adapterless unions of this general character are shown, for example, in Baron U.S. Pat. No. 3,346,275 and Epstein U.S. Pat. No. 3,408,093. In structures of this type, a union nut together with a dielectric separator is slipped over each end of the flexible conduit. The ends of the flexible conduit are then each provided with an intermediate bead as in the Epstein patent or a flared end as in in the Baron patent to form a seat for a seal washer designed to be engaged by the end of the rigid pipe. Finally, the rubber seal washer is inserted into the outwardly opening threaded end of the union nut and positioned against the intermediate bead or flared end. The unit comprising the flexible conduit, union nuts, dielectric sleeves and washers is then shipped to the distributor or customer. In handling, the union nut may be pushed back on the ends of the flexible tubing. This dislodges the rubber sealing ring which is often lost. This results in considerable inconvenience and customer dissatisfaction.

The primary object of this invention is to provide a simple inexpensive arrangement whereby the union nut is precluded from moving inwardly of the end of the flexible conduit while it is permitted freely to rotate for purposes of threadedly engaging the rigid conduit. Accordingly, the seal washer is secured against accidental separation.

BRIEF SUMMARY OF THE INVENTION

In order to accomplish the foregoing objective and to overcome the disadvantages of prior art structures, I provide an arrangement in which the end of the flexible conduit has an intermediate section that converges. A stop ring inserted ahead of the union nut and dielectric sleeve seats at the convergent section. By design control of its inside diameter, the stop ring is automatically located so as to permit freedom of rotational movement of the union nut while preventing substantial longitudinal movement.

BRIEF DESCRIPTION OF THE DRAWINGS

A detailed description of the invention will be made with reference to the accompanying drawings which are to scale. The description of the invention is of the best presently contemplated mode of carrying out the invention. This description is not to be taken in a limiting sense, but is made merely for the purpose of illustrating the general principles of the invention.

FIG. 1 is a broken elevational view of a flexible conduit assembly incorporating the present invention.

FIG. 2 is a side elevational view of tubing used in making the flexible conduit shown in FIG. 1.

FIG. 3 is an enlarged fragmentary axial sectional view taken along a plane corresponding to line 2–2 of FIG. 1.

DETAILED DESCRIPTION

In FIG. 1 there is shown a flexible connector comprising a conduit 6 and two union nut assemblies 8 and 10 at opposite ends. The central portion of the conduit is provided with circular or spiral convolutions to impart the desired degree of flexibility. The convolutions are formed in the tubing shown in FIG. 2 in a manner shown and described in my prior U.S. Pat. No. 3,387,477 issued June 11, 1968. The ends of the tubing (FIG. 2) are swaged down to provide at each end a generally cylindrical terminal part 12 of reduced diameter. A frustoconical intermediate part 14 joins each reduced cylindrical part to the central larger diameter part. The parts 12 and 14 clear forming rollers whereby convolutions are formed only on the central part.

After the convolutions are formed, a stop ring 16 (FIG. 3) is placed over each end of the tubing. The inner diameter of the stop ring 16 provides a running fit with the cylindrical part 12. The taper of the intermediate part 14 causes the stop ring 16 to come to rest at the region of the junction 18 between the cylindrical and frustoconical parts. The stop ring wedges in place just beyond the junction 18.

A union nut 20 and a dielectric sleeve 22 are then slipped in place. The end of the cylindrical part is then swaged to provide a bearing flange 24 overlying the end of the dielectric sleeve 22. The base of the flange 24 is spaced from the junction 18 by an amount corresponding to the length of the sleeve 22. Hence, as the flange 24 is formed, the stop ring 16 is wedged in place by longitudinal pressure exerted through the sleeve. The sleeve 22 when seated in the nut 20 projects rearwardly a slight amount to define with the stop ring 16 a small clearance space 26 for limited axial movement of the nut 20. Finally, a resilient seal washer 28 is inserted in the nut and located against the flange 24. The washer normally is slightly larger than the interior threads of the nut 20, and hence, stays in place by frictional restraint. The threads extend axially an amount substantially exceeding the combined axial length of the clearance space 26 and the washer 28. Hence, the limited inward movement of the nut 20 permitted by the stop ring 22 is ineffective to dislodge the seal washer, 28, and it is retained in place. The clearance 26 ensures that the nut 20 is free to rotate.

The stop rings are made of plastic in order to ensure electrical isolation between the union nut 20 and the conduit 6.

I claim:

1. A flexible connector for establishing a connection between two rigid pipes, or the like, comprising:
    a. a thin-walled conduit having a central part provided with convolutions to impart flexibility to said conduit;
    b. said conduit having at each end,
        i. a substantially cylindrical terminal part of reduced diameter, and
        ii. a substantially frustoconical part joining the cylindrical part of the corresponding end of said central part;
    c. a stop ring for each end of said connector, each ring being made of electrical insulation material and fitted on said cylindrical part and wedged in place at the smaller diameter end of said frustoconical part adjacent its juncture with the corresponding cylindrical part;
    d. a dielectric sleeve for each end of said connector and fitted on the corresponding cylindrical part, the inner end of said sleeve abutting the corresponding stop ring;
    e. a union nut for each end of said connector, each union nut having a stepped bore forming an outer larger diameter interiorly threaded part, an inner smaller diameter cylindrical part, and an outwardly facing seat between said bore parts, said smaller diameter part having an inner diameter smaller than the outer diameter of said stop ring and fitting the corresponding dielectric sleeve for rotation about the common axis of said sleeve and smaller diameter part;
    f. each dielectric sleeve having a part at its outer end seated on said outwardly facing seat of the corresponding union nut;
    g. each of said substantially cylindrical parts terminating at a flange overlying said seated part of the corresponding dielectric sleeve and cooperating with the corresponding stop ring to capture said dielectric sleeve and to secure it against longitudinal separation from said conduit, the corresponding union nut being retained on said conduit by said seated part of the corresponding dielectric sleeve;
    h. each dielectric sleeve projecting inwardly of the corresponding union nut when seated on said nut to provide an axial clearance space between the inner end of the companion union nut and stop ring;

i. a seal washer for each union nut and frictionally received in the outer larger diameter part of the corresponding union nut and positioned in line with said flange beyond the end of said conduit; and j. the combined length of each sealing washer and the clearance space provided at the corresponding stop ring being substantially less than the length of said larger diameter part of the corresponding union nut whereby said washer is retained in the corresponding union nut during shipment and storage by the limited permitted axial movement of the corresponding union nut.

2. A flexible connector for establishing a connection between two rigid pipes, or the like, comprising:

a. a thin-walled conduit having a central part provided with convolutions to impart flexibility to said conduit;

b. said conduit having at each end,
  i. a substantially cylindrical terminal part of reduced diameter, and
  ii. a part joining the cylindrical part to the corresponding end of said central part;

c. a stop ring for each end of said connector, each ring being seated on the corresponding joining part of said conduit;

d. a dielectric sleeve for each end of said connector and fitted on the corresponding cylindrical part, the inner end of said sleeve abutting the corresponding stop ring;

e. a union nut for each end of said connector, each union nut having a stepped bore forming an outer larger diameter interiorly threaded part, an inner smaller diameter cylindrical part, and an outwardly facing seat between said bore parts, said smaller diameter part having an inner diameter smaller than the outer diameter of said stop ring and fitting the corresponding dielectric sleeve for rotation about the common axis of said sleeve and smaller diameter part;

f. each dielectric sleeve having a part at its outer end seated on said outwardly facing seat of the corresponding union nut;

g. each of said substantially cylindrical parts terminating at a flange overlying said seated part of the corresponding dielectric sleeve and cooperating with the corresponding stop ring to capture said dielectric sleeve and to secure it against longitudinal separation from said conduit, the corresponding union nut being retained on said conduit by said seated part of the corresponding dielectric sleeve;

h. each dielectric sleeve projecting inwardly of the corresponding union nut when seated on said nut to provide an axial clearance space between the inner end of the companion union nut and stop ring;

i. a seal washer for each union nut, means for retaining the seal washer in the outer larger diameter part of the corresponding union nut and positioned in line with said flange beyond the end of said conduit; and j. the combined length of each sealing washer and the clearance space provided at the corresponding stop ring being substantially less than the length of said larger diameter part of the corresponding union nut whereby said washer is retained in the corresponding union nut during shipment and storage by the limited permitted axial movement of the corresponding union nut.

3. A connector structure comprising:

a. a conduit having a reduced smaller diameter cylindrical part;

b. means forming a stop adjacent the inner end of said smaller diameter part;

c. a dielectric sleeve fitted on the cylindrical part with its inner end abutting the stop;

d. a union nut having a stepped bore forming an outer larger diameter cylindrical part, an inner smaller diameter cylindrical part, and an outwardly facing seat between said bore parts, said smaller diameter part having an inner diameter smaller than the outer diameter of said stop means and fitting the dielectric sleeve for rotation about the common axis of said sleeve and smaller diameter part;

e. the dielectric sleeve having a part at its outer end seated on said outwardly facing seat of said union nut;

f. said cylindrical part of said conduit terminating at a flange overlying said seated part of said dielectric sleeve and to secure it against longitudinal separation from said conduit, said union nut being retained on said conduit by said seated part of the dielectric sleeve;

g. the dielectric sleeve when seated projecting inwardly of said union nut to provide an axial clearance space between the inner end of the union nut and said stop;

h. a seal washer, means for retaining said seal washer in the larger diameter part of the union nut and positioned in line with said flange beyond the end of said conduit; and i. the combined length of said sealing washer and the clearance space between the stop and said union nut being substantially less than the length of said larger diameter part of said union nut whereby said washer is retained in the union nut during shipment and storage by the limited permitted movement of the union nut.